United States Patent
Funakoshi

(10) Patent No.: US 7,017,177 B1
(45) Date of Patent: Mar. 21, 2006

(54) DIGITAL BROADCASTING RECEIVER AND METHOD OF CONTROLLING THE SAME

(75) Inventor: Hideaki Funakoshi, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 09/328,484

(22) Filed: Jun. 9, 1999

(51) Int. Cl.
    H04N 5/50 (2006.01)
    H04N 7/00 (2006.01)

(52) U.S. Cl. .......... 725/118; 725/37; 725/38; 725/126; 348/385.1; 348/389.1

(58) Field of Classification Search .......... 725/100, 725/131, 139, 151, 48–49, 54; 348/554, 348/555, 556, 388.1, 398.1, 392
See application file for complete search history.

(56) References Cited

U.S. PATENT DOCUMENTS

| | | | | |
|---|---|---|---|---|
| 5,497,197 A | * | 3/1996 | Gove et al. | 348/388.1 |
| 5,583,562 A | * | 12/1996 | Birch et al. | 725/151 |
| 5,900,915 A | * | 5/1999 | Morrison | 725/44 |
| 6,025,878 A | * | 2/2000 | Boyce et al. | 348/402 |
| 6,104,436 A | * | 8/2000 | Lee | 348/563 |
| 6,108,046 A | * | 8/2000 | Wu et al. | 348/558 |
| 6,111,611 A | * | 8/2000 | Ozkan et al. | 348/465 |
| 6,177,931 B1 | * | 1/2001 | Alexander et al. | 345/327 |
| 6,285,408 B1 | * | 9/2001 | Choi et al. | 348/555 |
| 6,330,036 B1 | * | 12/2001 | Murakami et al. | 348/555 |
| 6,369,861 B1 | * | 4/2002 | Lownes | 348/731 |
| 6,763,522 B1 | * | 7/2004 | Kondo et al. | 725/39 |

* cited by examiner

Primary Examiner—Christopher Grant
Assistant Examiner—Reuben M. Brown
(74) Attorney, Agent, or Firm—Crowell & Moring LLP

(57) ABSTRACT

A digital broadcasting receiver capable of receiving HD (High Definition) broadcasting, SD (Standard Definition) broadcasting and the like. In the digital broadcasting receiver, a digital broadcasting signal subjected to demodulation is separated/divided in a transport unit before being supplied to decoders. Data on a packet ID included in the digital broadcasting signal is outputted from the transport unit. An MPU determines HD broadcasting or SD broadcasting according to the data on the packet ID and when the MPU determines the SD broadcasting, it instructs the transport unit to have a set subchannel displayed and also instructs an OSD control unit to make an OSD of the subchannel.

4 Claims, 2 Drawing Sheets

DIGITAL BROADCASTING RECEIVER AND METHOD OF CONTROLLING THE SAME

BACKGROUND OF THE INVENTION

1. Field of the Invention

This invention relates to a digital broadcasting receiver which is utilized for receiving ground waves and the like, and more particularly to a digital broadcasting receiver capable of receiving HD (High Definition) broadcasting, SD (Standard Definition) broadcasting and the like, and to a method of controlling the digital broadcasting receiver.

2. Description of the Related Art

In the process of transition from analog to digital television broadcasting, a great diversity of broadcasting is increasingly attempted; for example, HD broadcasting utilizing a band equivalent to one channel and SD broadcasting utilizing several channels resulting from dividing the band equivalent to one channel. When the HD broadcasting that has been terminated is switched to the SD broadcasting of the same channel, the user naturally needs to select a subchannel of the SD broadcasting.

There has been proposed a method of selection comprising the steps of dividing a display screen into a plurality of windows and simultaneously causing the subchannels of SD broadcasting to be displayed on the respective windows whereby to select one of the subchannels therefrom (Japanese Patent Unexamined Publication No. Hei. 9-326972).

In the conventional method above, however, the user would feel a sense of incongruity because the display mode of the screen suddenly changes to display the divided windows in only the form of static images after the termination of the HD broadcasting. Moreover, there can be the user's favorite subchannel in the HD broadcasting and the aforementioned method is never friendly as the user is required to select the subchannel while looking out the divided windows on the screen whenever the HD broadcasting is switched to the SD broadcasting.

SUMMARY OF THE INVENTION

The present invention was made under the aforementioned background and an object of the invention is to provide a digital broadcasting receiver which does not give a user a sense of incongruity even when one-channel HD broadcasting is switched to multi-channel SD broadcasting and the like and is so improved as to be friendly to the user in view of selecting a subchannel. Another object of the invention is to provide a method of controlling the digital broadcasting receiver.

According to an aspect of the present invention, there is provided a digital broadcasting receiver comprising: a transport unit for separating/dividing a digital broadcasting signal that has been subjected to demodulation in order to output the separated/divided digital broadcasting signal toward a decoder; a broadcast detecting unit for detecting one of one-channel broadcasting and multi-channel broadcasting according to a packet ID which is included in the digital broadcasting signal and has been inputted to the broadcast detecting unit from the transport unit; and a subchannel control unit for controlling the transport unit so that when a result detected by the broadcast detecting unit indicates the multi-channel broadcasting, a broadcasting signal including a predetermined packet ID is outputted.

According to another aspect of the present invention, there is provided a method of controlling a digital broadcasting receiver by controlling a transport unit for separating/dividing a digital broadcasting signal that has been subjected to demodulation in order to output the separated/divided digital broadcasting signal toward a decoder, and an OSD control unit for causing an OSD to be made by superimposing data on a broadcasting screen, the method comprising the steps of: receiving data on a packet ID included in the digital broadcasting signal from the transport unit; determining whether the digital broadcasting signal is transmitted for one-channel broadcasting or multi-channel broadcasting on the basis of the data on the packet ID; instructing the transport unit to output a broadcasting signal including a predetermined packet ID when it is determined that the digital broadcasting signal is transmitted for the multi-channel broadcasting; and instructing the OSD control unit to make an OSD of a subchannel corresponding to the packet ID.

DETAILED DESCRIPTION OF THE PREFERRED EMBODIMENT

Figure 1:
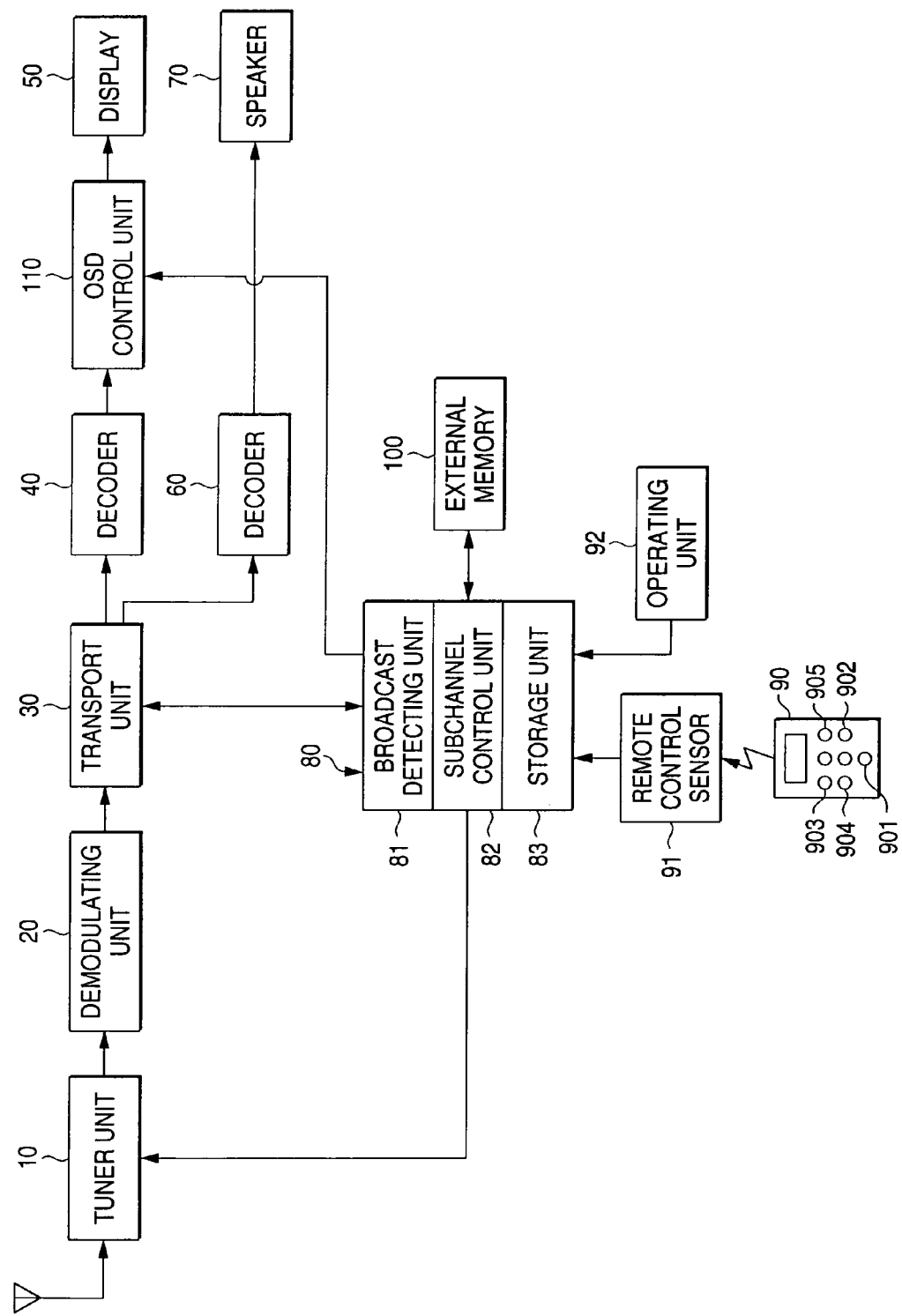
FIG. 1 is a block diagram of a digital broadcasting receiver for the purpose of describing an embodiment of the present invention.

An embodiment of the present invention will now be described with reference to the drawings. FIG. 1 is a block diagram of a digital broadcasting receiver; and FIG. 2, a flowchart of a program to be processed by an MPU of the receiver.

The digital broadcasting receiver is a television receiver for receiving HD and SD broadcasting or ground waves in order to display the broadcast contents and has a circuit configuration as shown in FIG. 1.

In FIG. 1, reference numeral 10 designates a tuner unit for tuning and receiving a digital broadcasting signal; 20, a demodulating unit for demodulating an output signal of the tuner unit 10; and 30, a transport unit for separating/dividing a video signal, an audio signal and the like from an output signal of the demodulating unit 20.

The video signal outputted from the transport unit 30 is supplied to a display 50 via a decoder 40 and an OSD (On Screen Display) control unit 110. The OSD control unit 110 is a circuit, which is a general-purpose IC in this embodiment, for causing data on channel and the like to be superimposed on the broadcasting screen displayed by the display 50. On the other hand, the audio signal outputted from the transport unit 30 is supplied to a speaker 70 via a decoder 60.

Although the transport unit 30 is the circuit used for separating/dividing the digital broadcasting signal subjected to demodulation as mentioned above, it is also a circuit which functions to output data on a packet ID (PID) included in the digital broadcasting signal during the separating/dividing process. The transport unit 30 is controlled by an external input to determine what kind of packet ID of the digital broadcasting signal (e.g., video signal, audio signal and so forth) is output from the transport unit 30.

Reference numeral 80 designates an MPU for controlling the whole receiver including the tuner unit 10, the transport unit 30 and the decoders 40 and 60. A remote control sensor 91 for receiving a signal from remote controller 90 for remotely operating the whole receiver and an operating unit 92 operating like the remote controller 90 are connected to the input port of the MPU 80.

The remote controller 90 is provided with a power supply switch 901, a mode switching key 902, a channel selection key 903 for making ordinary channel selection, a channel up/down key 904 and the like. In addition, the remote controller 90 is provided with a subchannel selection key 905 for making SD broadcasting selection. Incidentally, the operating unit 92 is also provided with similar keys.

The subchannel selection key 905 is simultaneously used to set and input a subchannel to be initially displayed (equivalent to a setting unit) when the SD broadcasting is activated after the termination of the HD broadcasting.

The MPU 80 demonstrates the functions of a broadcast detecting unit 81, a subchannel control unit 82 and a storage unit 83 by sequentially processing a program which has been recorded previously in an external memory 100.

The contents of the program used for letting the storage unit 83 demonstrate its function are such that the program is processed when the operating mode is switched to a subchannel setting mode after the mode switching key 902 is pressed and that the data is stored in, for example, an RAM of the MPU 80 when the subchannel is set and inputted via the subchannel selection key 905. The setting and inputting operation is performed by the user on a SD broadcasting basis.

The broadcast detecting unit 81 is used for detecting whether the digital broadcasting signal is transmitted for the HD broadcasting or SD broadcasting on the basis of data on the packet ID outputted from the transport unit 30.

The subchannel control unit 82 controls not only the transport unit 30 so that the digital broadcasting signal of the packet ID corresponding to the subchannel held by the storage unit 83 is outputted when the result detected by the broadcast detecting unit 81 indicates the SD broadcasting but also the OSD control unit 110 so that data on the subchannel of the digital broadcasting signal outputted from the transport unit 30 is outputted and displayed.

Further, the relations of all the subchannels contained in the SD broadcasting to the packet IDs are listed in a table of the external memory 100 or the like on an SD broadcasting basis, and the MPU 80 is allowed to recognize what kind of packet ID is included in the subchannel inputted for setting or selected via the subchannel selection key 905.

Figure 2:
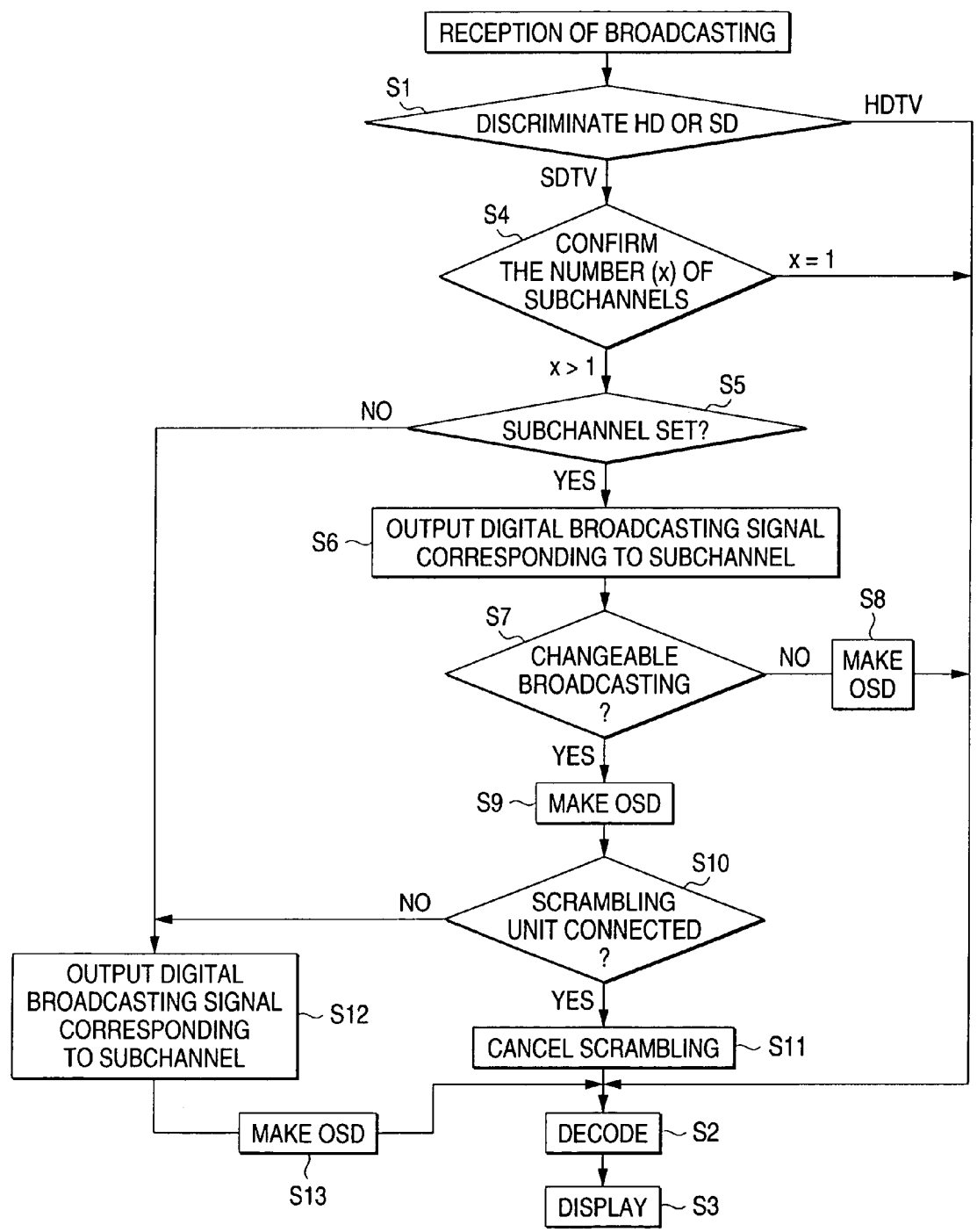
FIG. 2 is a flowchart of a program to be processed by an MPU (Micro Processing Unit) of the digital broadcasting receiver.

FIG. 2 shows part of the contents of a program to be processed in the MPU 80, the program including a program for demonstrating the functions of the broadcast detecting unit 81 and the subchannel control unit 82. This program together with the operation of the digital broadcasting receiver will subsequently be described.

When the power supply is turned on via the remote controller 90 or the operating unit 92, the digital broadcasting signal is received by the tuner unit 10 based on channel selection and the digital broadcasting signal thus selected is sequentially inputted via the demodulating unit 20 to the transport unit 30. When the channel selection key 903 is pressed, the tuner unit 10 is instructed to change the receiving frequency of the signal.

Then, the MPU 80 feeds data on the packet ID from the transport unit 30 and determines whether the digital broadcasting signal selectively received on the basis of the data has been transmitted for the HD broadcasting or SD broadcasting. More specifically, a method of determining the signal through the S/W process is used to discriminate the HD or SD broadcasting (S1).

When the HD broadcasting is determined, the transport unit 30 and the like is instructed to separate/divide the digital broadcasting signal subjected to demodulation into the video and audio signals to make the decoders 40 and 60 process the video and audio signals (S2) and to have the video signal displayed (S3). Then, the HD broadcasting is outputted and displayed on the display 50, whereas the voice is outputted from the speaker 70. In this case, an OSD of the channel data is made on the screen of the HD broadcasting if necessary similarly as in the conventional receiver.

When the SD broadcasting is determined, on the other hand, the number of subchannels is confirmed. That is, the number of subchannels is determined to be 1 when the ID data fed from the transport unit 30 is 1, whereas a plurality of subchannels are determined to exist when the ID data is greater than 1 (S4). The reason for confirming the number of subchannels is that only one channel may be used even in the case where the multi-channel broadcasting is utilized by dividing a band equivalent to one channel into several channels.

When the number of subchannels of the SD broadcasting selectively received is 1, the transport unit 30 and the like is instructed to separate/divide the digital broadcasting signal subjected to demodulation into the video and audio signals as it is unnecessary to select any subchannel, and the video and audio signals are caused to be processed in the decoders 40 and 60 (S2) and displayed (S3). Then, the subchannel of the SD broadcasting is displayed on the display 50 and the voice is outputted from the speaker 70. An OSD of the subchannel data is made on the screen of the SD broadcasting if necessary similarly as in the case of HD broadcasting.

When the number of subchannels of the SD broadcasting selectively received is greater than 1, the subchannel data held in the storage unit 83 is read out to determine whether or not the subchannel has been set according to the presence or absence of the data (S5).

When the subchannel is set, that is, when the subchannel data is held in the storage unit 83, the transport unit 30 is instructed so that the digital broadcasting signal including the packet ID corresponding to the subchannel is outputted (S6). Then, the transport unit 30 operates to separate/divide the digital broadcasting signal subjected to demodulation into the video and audio signals, which are then supplied to the decoders 40 and 60.

Subsequently, information as to chargeable broadcasting channel previously recorded in the external memory 100 is checked to determine whether or not the subchannel is intended for chargeable broadcasting (S7).

When the set subchannel is not intended for chargeable broadcasting, the OSD control unit 110 is instructed to make an OSD of the subchannel data concerned (S8), and the video and audio signals outputted from the transport unit 30 are caused to be processed by the decoders 40 and 60 (S2) before being displayed (S3).

Then, the set subchannel out of those of the SD broadcasting is displayed on the display 50 and the voice is outputted from the speaker 70. The subchannel data is displayed on the display screen for a predetermined time.

When the set subchannel is intended for chargeable broadcasting, on the other hand, the OSD control unit 110 is instructed to make an OSD of the subchannel data (S9) whereby to confirm whether or not the connection of a scrambling unit (not shown) necessary for watching the chargeable broadcasting television has been established by checking to see if I/O data transmission and reception are possible or not (S10).

When the connection of the scrambling unit (not shown) is established, the scrambling unit is operated to cancel the scrambling of the digital broadcasting signal (S11) and the signals are caused to be processed by the decoders 40 and 60 (S2) before being displayed (S3). Then, the chargeable broadcasting is displayed on the display 50 and the voice is outputted from the speaker 70. An OSD of the subchannel data is made on the display screen for a predetermined time.

When the subchannel is not set yet, that is, when the subchannel data is not held in the storage unit 83 yet, data inputted via the subchannel selection key 905 is to be waited for. When a subchannel is selected via the subchannel selection key 905 or the channel up/down key 904, the transport unit 30 is instructed to output the digital broadcasting signal including the packet ID corresponding to the selected subchannel (S12). Further, the OSD control unit 110 is instructed to make an OSD of the subchannel data (S13), and the video and audio signals outputted from the transport unit 30 are caused to be processed by the decoders 40 and 60 (S2) before being displayed (S3).

The same processing is applied to a case where the connection of the scrambling unit (not shown) has not been established, though the subchannel for chargeable broadcasting has been set.

Further, the selected subchannel out of those of the SD broadcasting is displayed on the display 50 and the voice is outputted from the speaker 70. An OSD of the subchannel data is made on the display screen for a predetermined time. Even when the chargeable broadcasting is selected, however, the broadcasting cannot be watched unless the digital broadcasting signal is subjected to the scrambling process, and only an OSD of the selected subchannel data is made.

In the digital broadcasting receiver according to the present invention, the subchannel set by the user is displayed instantly when the HD broadcasting is switched to the SD broadcasting and an OSD of the subchannel is made. Since it is possible to display the user's favorite subchannel initially, the receiver is very convenient to the user. Moreover, any subchannel can readily be selected via the subchannel selection key 905 or the channel up/down key 904 thereafter with an ordinary sense of selecting a station.

The digital broadcasting receiver according to the present invention is applicable to not only a television receiver but also a video apparatus or the like of course as long as it is capable of receiving both one-channel broadcasting utilizing a band equivalent to one channel and multi-channel broadcasting utilizing several channels resulting from dividing the band equivalent to one channel.

Such a digital broadcasting receiver may be arranged so that a subchannel to be displayed initially is not set by the user but a subchannel that has been preset within the receiver is displayed initially when the one-channel broadcasting is switched to the multi-channel broadcasting.

Hardware may also be used to realize the functions of the broadcast detecting unit and the subchannel control unit.

As described above, in the digital broadcasting receiver of the invention, since the predetermined subchannel is displayed instantly when the multi-channel broadcasting such as SD broadcasting is activated after the termination of the one-channel broadcasting such as HD broadcasting, the display mode is not changed unlike in the conventional receiver and the user is never given a sense of incongruity. Moreover, any subchannel of the multi-channel broadcasting can be selected smoothly to ensure that the operation is made friendly to the user.

What is claimed is:

1. A digital broadcasting receiving comprising:
    a transport unit for separating/dividing a digital broadcasting signal that has been subjected to demodulation in order to output the separated/divided digital broadcasting signal toward a decoder;
    a memory unit for storing a relationship of each of a plurality of subchannels of multichannel broadcasting to each of a plurality of packet IDs in a table wherein said subchannels are defined on a standard definition broadcasting basis;
    a broadcast detecting unit for detecting one of one-channel broadcasting and said multi-channel broadcasting according to a packet ID which is included in the digital broadcasting signal and has been inputted to the broadcast detecting unit from said transport unit;
    a subchannel control unit for controlling said transport unit so that when a result detected by said broadcast detecting unit indicates the multi-channel broadcasting, a predetermined packet ID of a set subchannel is read out of the table; and a broadcasting signal including a predetermined packet ID is outputted; and
    a setting unit for setting said set subchannel to be initially displayed when the one-channel broadcasting is switched to the multi-channel broadcasting, and a recording unit for holding the subchannel set via said setting unit, wherein said subchannel control unit controls said transport unit so that when the result detected by said broadcast detecting unit indicates the multi-channel broadcasting, a broadcasting signal including a packet ID corresponding to the subchannel held in said recording unit is outputted.

2. The digital broadcasting receiver as claimed in claim 1, wherein said subchannel control unit controls said transport unit so that when the result detected by said broadcast detecting unit indicates the multi-channel broadcasting, the broadcasting signal including the packet ID corresponding to the subchannel held in said recording unit is outputted and then controls said transport unit so that when a subchannel selection key or channel up/down key provided in a receiver body or a remote controller is pressed, a broadcasting signal including a packet ID corresponding to a selected subchannel is outputted.

3. The digital broadcasting receiver as claimed in claim 1, wherein said subchannel control unit is arranged so that when said broadcasting detecting unit indicates that the one-channel broadcasting has been switched to the multi-channel broadcasting, an OSD of the subchannel of the broadcasting signal outputted from said transport unit is made.

4. A computer software product for performing a method of controlling a digital broadcasting receiver via control of a transport unit for separating/dividing a digital broadcasting signal subjected to demodulation in order to output a separated/divided digital broadcasting signal toward a decoder, and an OSD control unit or causing an OSD to be made by superimposing data on a broadcasting screen, the computer software product, comprising:
    a computer readable medium having stored thereon computer program code segments comprising:
    code for storing in a table a relationship of each of a plurality of subchannels of multi-channel broadcasting to each of a plurality of packet IDs, wherein said subchannels are defined on a standard definition broadcasting basis;
    whether the digital broadcasting signal is transmitted for one-channel broadcasting or said multi-channel broadcasting on the basis of data on a packet ID included in the digital broadcasting signal from the transport unit;

instruct the code for instructing transport unit to read out from said table a predetermined packet ID of a set subchannel and to output a broadcasting signal including said predetermined packet ID when it is determined that the digital broadcasting signal is transmitted for the multi-channel broadcasting;

code for instructing said OSD control unit to make an OSD of a sub-channel corresponding to the packet ID; and setting code for said set subchannel to be initially displayed when the one-channel broadcasting is switched to the multi-channel broadcasting, and holding the set subchannel, wherein when there is multi-channel broadcasting, outputting a broadcasting signal including a packet ID corresponding to the subchannel held in said recording.

* * * * *